United States Patent Office

3,498,872
Patented Mar. 3, 1970

3,498,872
GLASS FIBER REINFORCED POLYAMIDE RESIN
ARTICLE AND PROCESS THEREFOR
Samuel Sterman, Williamsville, and James D. Marsden,
Tonawanda, N.Y., assignors to Union Carbide Corporation, a corporation of New York
No Drawing. Continuation of application Ser. No.
523,862, Feb. 1, 1966. This application Jan. 21,
1969, Ser. No. 797,338
Int. Cl. B32b *17/10, 27/34*
U.S. Cl. 161—93                  16 Claims

ABSTRACT OF THE DISCLOSURE

A thermoformed polyamide resin composite and method for producing the same, the method comprising the steps of providing a fibrous glass substrate, treating the glass substrate with an organofunctional alkyltrialkoxysilane which is a member from the group consisting of an (epoxycycloalkyl) alkyltrialkoxysilane, a glycidoxyalkyltrialkoxysilane, a cyanoalkyltrialkoxysilane, a carbalkoxyalkyltrialkoxysilane, and an aminoalkyltrialkoxy silane so as to deposit thereon said silane or the corresponding hydrolyzate thereof, intimately contacting the treated glass subtrate with the polyamide resin, and thermoforming the resulting composite at a temperature below the decomposition of the resin and the silane; the amount of silane deposited on the glass fiber being sufficient to enhance the flexural strength of the thermoformed composite.

---

This application is a streamlined continuation of application Ser. No. 623,862 filed Feb. 1, 1966, now abandoned.

This invention is directed to glass-reinforced polyamide resins.

Polyamide resin, also known as nylon, is a thermoplastic material of construction which can be used in a wide variety of applications from switchgear and household appliances to sporting goods such as football helmets and the like. The general family of polyamide resins is derived from the reaction of various diamines with dibasic organic acids so as to form linear chains containing the amides. Generally polyamide resins have excellent molding properties, good abrasion resistance, toughness, impact strength, electrical insulation, and chemical resistance.

Notwithstanding these desirable physical properties additional improvement thereof can be achieved by reinforcing these resins by strengthening materials such as glass in fibrous form.

It has now been found that a further improvement in the physical properties of glass-reinforced polyamide resins can be achieved by treating the fibrous glass, prior to its incorporation within the resin, with certain chemical compounds. Accordingly, it is the principal object of this invention to provide as a material of construction a polyamide resin reinforced by fibrous glass and exhibiting materially enhanced physical properties.

A further object of this invention is to provide a method for enhancing the physical properties of glass-reinforced polyamide resin.

Still other objects will become apparent to one skilled in the art upon reference to the ensuing specification and the claims.

The objects of this invention are achieved by an article of manufacture which is a thermoplastic composite of fibrous glass, a polyamide, and an organofunctional alkyltrialkoxysilane which can be an (epoxycycloalkyl)alkyltrialkoxysilane, a glycidoxyalkyltrialkoxysilane, a cyanoalkyltrialkoxysilane, a carbalkoxyalkyltrialkoxysilane, an aminoalkyltrialkoxysilane, or the corresponding hydrolyzate of the foregoing.

The above article of manufacture, possessing the enhanced physical properties, can be prepared by (1) providing a fibrous glass substrate, (2) treating this substrate with the aforementioned organofunctional alkyltrialkoxysilane, (3) then intimately contacting the treated glass substrate with the polyamide resin, and (4) thermoforming the resulting composite at a temperature below the decomposition temperature of the resin and the silane.

As pointed out above, polyamide resin is thermoplastic and is derived from the reaction of various diamines with dibasic organic acids. The resin is substantially fully polymerized, is chemically inert, and contains no apparent reaction sites. The resin may be thermoformed over and over again without undergoing further cure or hardening.

The crux of the present invention lies in the selection of the proper organofunctional silane for the treatment of the fibrous glass employed for reinforcement. This selection must be carried out with great care since an improper choice will work to the detriment of the physical properties of the ultimate article. Furthermore, considerable research into the reaction mechanisms involved has failed to cast sufficient light on the observed phenomena to enable the skilled artisan to make a reliable prediction of the performance of a particular organofunctional silane in the selected resin system even on the basis of observed performance of silanes having closely related organofunctional groups.

The following groupings of organofunctional silanes have been found to materially enhance the physical properties of polyamide resin reinforced with fibrous glass: (a) an (epoxycycloalkyl)alkyltrialkoxysilane such as beta - (3,4 - epoxycyclohexyl)ethyltrimethoxysilane, beta-(3,4 - epoxycyclohexyl)propyltriethoxysilane, beta - (4,5-epoxycycloheptyl)ethyltrimethoxysilane, delta-(2,3-epoxycyclohexyl)butyltripropoxysilane, and the like; (b) a glycidoxyalkyltrialkoxysilane such as gamma-glycidoxypropyltrimethoxysilane, beta - glycidoxyethyltributoxysilane, delta - glycidoxybutyltriethoxysilane, gamma-glycidoxyoctyltripropoxy silane, and the like; (c) a cyanoalkyltrialkoxysilane (including the isocyano compounds) such as beta-cyanoethyltriethoxysilane, gamma-isocyanopropyltriethoxysilane, beta - cyanobutyltrimethoxysilane, beta-cyanooctyltributoxysilane, gamma-isocyanooctyltrimethoxysilane, and the like; (d) a carbalkoxyalkyltrialkoxysilane such as beta-carbethoxyethyltriethoxy silane, gamma-carbmethoxypropyltriethoxysilane, delta - carbhexoxybutyltrimethoxysilane, beta - carbpropoxyoctyltripropoxysilane, and the like; and (e) an aminoalkyltrialkoxysilane (including the N-hydroxyalkyl-substituted compounds) such as gamma-aminopropyltriethoxysilane, gamma-aminopropyltrimethoxysilane, beta - aminoethyltributoxysilane, N-beta - (hydroxyethyl)-gamma-aminopropyltriethoxysilane, N,N - bis-(beta-hydroxyethyl)gamma-aminopropyltriethoxysilane, and the like.

In order to be suitable for the purposes of the present invention the glass substrate must be fibrous; however, any form of fibrous glass can be employed. Suitable are woven cloth, chopped mat, continuous strand mat, chopped strand, roving, woven roving, and the like. Powdered glass is not suitable.

The fibrous glass can be treated, i.e., sized, with the organofunctional silane in any convenient manner. The silane can be applied to the glass fibers at the extrusion bushing as the fibers are produced, or the sizing can be carried out by means of an aqueous solution of the proper silane into which the glass fibers are dipped and subsequently dried. In the latter case the silane is deposited on the glass fiber as the corresponding hydrolyzate.

It will be apparent to one skilled in the art that the materials actually deposited on the fibrous glass from aqueous solutions are the silane-derived hydrolyzates rather than the silanes as such. The hydrolyzates are siloxanes, e.g., an aqueous solution of beta-(3,4-epoxycyclohexyl)ethyltrimethoxysilane deposits on the fibrous glass as beta-(3,4-epoxycyclohexyl)ethyl siloxane. Also, during hydrolysis the epoxy ring may open to produce the corresponding hydroxycyclohexylethylsiloxane.

The loading of the silane on the glass fibers must be sufficient to enhance the flexural strength of the ultimate thermoformed article. While the practical applications the loading is usually expressed in terms of weight percent, based on the weight of the treated glass fibers, it must be noted that the minimum loading requirement may vary depending on the surface area of the particular glass fibers that are employed. When fibrous glass having a surface area of from about 0.1 to about 0.2 square meters per gram is employed, the effective silane loading can range from about 0.01 to about 5 weight percent, based on the weight of the treated fiber. Preferably the silane loading is in the range from about 0.1 to about 0.75 weight percent.

The silane-treated fibrous glass and the polyamide resin are brought in intimate contact with each other in any convenient manner and then thermoformed. The term "thermoforming," as used herein and in the appended claims, is taken to mean the transformation of the resin-silane-glass composite into useful shapes by means of heat and/or pressure. Illustrative thermoforming processes are molding, extrusion, hot calendering, casting, vacuum forming, and the like.

Several methods of achieving intimate contact between the treated fibrous glass and the polyamide resin are illustrated by the examples below. Still other methods include the utilization of polyamide film or sheet and the preparation therefrom of a dry laminate having alternating plies of fibrous glass and the resin which is then molded, the admixture of chopped, silane-treated glass fibers with warm or hot, fluid polyamide resin in a mechanical mixer prior to extrusion, the calendering of the polyamide resin onto a treated glass cloth or mat, and the like.

The following examples further illustrate the present invention.

Glass reinforcement in the form of woven glass cloth was used in all examples. The woven cloth is a satin weave cloth having a thickness of 10 mils, weighing about 8.9 ounces per square yard, having 57×54 ends and picks per square inch, and having a breaking strength of 375×350 pounds per square inch. The cloth had the weaving size burned off in a heat cleaning operation. The control in all instances comprised resin reinforcement with cloth having had no silane treatment.

The nylon thermoplastic resin used in the reinforced composites shown in the examples was in the form of a sheet approximately six inches wide and about 0.010 inch thick.

EXAMPLE I

This example shows a comparison of the effect on the flexural strength of a glass-reinforced nylon composite having the glass reinforcement treated with gamma-aminopropyltriethoxysilane. The silane was applied to the glass in the following manner:

An aqueous treating bath was prepared by dissolving about one wt.-percent of gamma-aminopropyltriethoxysilane in water. A clear colorless solution resulted. Six-inch wide strips of the aforementioned woven glass fabric were passed through this solution, dried at room temperature, and then placed in an oven for two and one-half minutes at about 135° C. (275° F.) The glass fabric was observed to pick up about one-half of its weight of the solution. After evaporation of the solvent there remained based on the weight of the fabric, a coating on the fabric equivalent to about 0.5 weight percent of the silane.

Eleven pieces, six inches by six inches, were cut from the resulting, silane-treated, glass fabric and twelve pieces the same size were cut from the nylon sheet. These were used to prepare a dry laminate of alternating plies of resin and glass. The dry laminate was placed in a press preheated to 224–232° C. (425–450° F.) and pressed to 0.125 inch stops. The materials were molded for about twenty minutes under these conditions, the press cooled, and the resulting composite then removed. This produced a composite having a thickness of about 0.125 inch and a resin content of 42±2 wt.-percent.

A second composite was prepared by the same procedure except the heat cleaned fabric used as reinforcement was not subjected to the silane treatment. Flexural strength test specimens of approximately 4″ x ½″ x ⅛″ were cut from both types of the above composites, and the flexural strength determined according to ASTM method, D–790–61. Specimens from each were divided into four groups. Group 1 was tested at room temperature, Group 2 at room temperature after the specimens had been immersed in water at 50° C. (122° F.) for 16 hours, Group 3 was tested at 149° C. (300° F.) and Group 4 was tested at 204° C. (400° F.) The flexural strengths are given in Table I, below.

EXAMPLE II

Another silane treated glass reinforced nylon composite was prepared as described in Example I, except N,N-bis-beta(hydroxyethyl) - gamma - aminopropyltriethoxysilane was used to treat the glass fabric. The flexural strengths of this composite under the stated conditions are given in Table I, below.

EXAMPLE III

Another silane treated glass reinforced nylon composite was prepared as described in Example I, except beta-cyanoethyltriethoxysilane was used to treat the glass fabric. Due to the solubility characteristics of this material, it was applied from a 75–25 water-ethanol solution. The flexural strengths of this composite under the stated conditions are given in Table I, below.

EXAMPLE IV

Another silane treated glass reinforced nylon composite was prepared as described in Example I except beta-carbethoxy ethyltriethoxysilane was used to treat the glass fabric. Due to the solubility characteristics of this material it was applied from a 25–75 water-ethanol solution. The flexural strengths of this composite under the stated conditions are given in Table I, below.

EXAMPLE V

Another silane treated glass reinforced nylon composite was prepared as described in Example I, except beta-(3,4-epoxycyclohexyl)ethyltrimethoxysilane was used to treat the glass fabric. Due to the solubility characteristics of this material it was applied from a 75–25 water-ethanol solution. The flexural strengths of this composite under the stated conditions are given in Table I, below.

EXAMPLE VI

Another silane treated glass reinforced nylon composite was prepared as described in Example I except gamma-glycidoxypropyltrimethoxysilane was used to treat the glass fabric. The flexural strengths of this composite under the stated conditions are given in Table I, below.

EXAMPLE VII

Another silane treated glass reinforced nylon composite was prepared as described in Example I, except gamma-isocyanopropyltriethoxysilane was used to treat the glass fabric. Due to the solubility characteristics of this material, the treating solution was prepared by dissolving the silane in water adjusted to pH 3.5–5 with acetic acid. The flexural strengths of this composite under the state conditions are given in Table I, below.

TABLE 1

| Silane—Composition | Wt. percent | Flexural Strength, p.s.i.×10⁻³ | | | |
|---|---|---|---|---|---|
| | | Dry | Wet | 149° C. (300° F.) | 204° F. (400° F.) |
| Control | | 26.2 | 18.4 | 13.5 | 6.3 |
| Gamma-aminopropyl-triethoxy-silane | 0.5 | 54.1 | 40.9 | 26.1 | 12.8 |
| N,N-bis-beta(hydroxy-ethyl)-gamma-amino-propyltriethoxy silane | 0.5 | 53.9 | 46.6 | 26.8 | 15.1 |
| Beta-cyanoethyltri-ethoxy silane | 0.5 | 53.8 | 44.8 | 31.3 | 13.2 |
| Beta-carbethoxyethyl-triethoxysilane | 0.5 | 51.4 | 39.1 | 19.2 | 7.8 |
| Beta-(3,4-epoxycyclo-hexyl)-ethyltrimethoxy-hexyl)-ethyltrimeth-oxysilane | 0.5 | 49.9 | 41.3 | 25.1 | 12.3 |
| Gamma-glycidoxypro-pyltrimethoxysilane | 0.5 | 47.0 | 41.5 | 27.9 | |
| Gamma-iso-cyanopro-pyltriethoxysilane | 0.5 | 54.4 | 41.2 | 24.0 | 13.9 |

The data in the foregoing table clearly show the substantial improvement in physical properties achieved through the silane treatment of the reinforcing glass fibers.

What is claimed is: :

1. A method for reinforcing substantially fully polymerized thermoplastic polyamide resin which comprises (1) providing a fibrous glass substrate, (2) treating the glass substrate with an organofunctional alkyltrialkoxysilane which is a member of the group consisting of an (epoxycycloalkyl)alkyltrialkoxysilane, a glycidoxyalkyltrialkoxysilane, a cyanoalkyltrialkoxysilane, a carbalkoxyalkyltrialkoxysilane, and an aminoalkyltrialkoxysilane so as to deposit thereon said silane or the corresponding hydrolyzate thereof, (3) intimately contacting the treated glass substrate with the polyamide resin, and (4) thermoforming the resulting composite at a temperature below the decomposition of the resin and the silane; the amount of silane deposited on the glass fiber being sufficient to enhance the flexural strength of the thermoformed composite.

2. The method in accordance with claim 1 wherein the organofunctional alkyltrialkoxysilane is gamma-aminopropyltriethoxysilane or the corresponding hydrolyzate thereof.

3. The method in accordance with claim 1 wherein the organofunctional alkyltrialkoxysilane is N,N-bis-beta-(hydroxyethyl-gamma)-aminopropyltriethoxysilane or the corresponding hydrolyzate thereof.

4. The method in accordance with claim 1 wherein the organofunctional alkyltrialkoxysilane is beta-cyanoethyl-triethoxysilane or the corresponding hydrolyzate thereof.

5. The method in accordance with claim 1 wherein the organofunctional alkyltrialkoxysilane is beta-carbethoxyethyltriethoxysilane or the corresponding hydrolyzate thereof.

6. The method in accordance with claim 1 wherein the organofunctional alkyltrialkoxysilane is beta-(3,4-epoxycyclohexyl)ethyltrimethoxysilane or the corresponding hydrolyzate thereof.

7. The method in accordance with claim 1 wherein the organofunctional alkyltrialkoxysilane is gamma-glycidoxypropyltrimethoxysilane or the corresponding hydrolyzate thereof.

8. The method in accordance with claim 1 wherein the organofunctional alkyltrialkoxysilane is gamma-isocyanatopropyltriethoxysilane or the corresponding hydrolyzate thereof.

9. An article of manufacture which is a thermoplastic composite of fibrous glass, a polyamide resin, and an organofunctional alkyltrialkoxysilane selected from the group consisting of an (epoxycycloalkyl)alkyltrialkoxysilane, a glycidoxyalkyltrialkoxysilane, a cyanoalkyltrialkoxysilane, a carbalkoxyalkyltrialkoxysilane, and an aminoalkyltrialkoxysilane or the corresponding hydrolyzate of the foregoing.

10. An article of manufacture in accordance with claim 9 wherein the organofunctional alkyltrialkoxysilane is gamma-aminopropyltriethoxysilane or the corresponding hydrolyzate thereof.

11. An article of manufacture in accordance with claim 9 wherein the organofunctional alkyltrialkoxysilane is N,N - bis-beta-(hydroxyethyl) - gamma - aminopropyltriethoxysilane or the corresponding hydrolyzate thereof.

12. An article of manufacture in accordance with claim 9 wherein the organofunctional algyltrialkoxysilane is beta-cyanoethyltriethoxysilane or the corresponding hydrolyzate thereof.

13. An article of manufacture in accordance with claim 9 wherein the organofunctional alkyltrialkoxysilane is beta-carbethoxyethyltriethoxysilane or the corresponding hydrolyzate thereof.

14. An article of manufacture in accordance with claim 9 wherein the organofunctional alkyltrialkoxysilane is beta - (3,4 - epoxycyclohexyl)ethyltrimethoxysilane or the corresponding hydrolyzate thereof.

15. An article of manufacture in accordance with claim 9 wherein the organofunctional alkyltrialkoxysilane is gamma-glycidoxypropyltrimethoxysilane or the corresponding hydrolyzate thereof.

16. An article of manufacture in accordance with claim 9 wherein the organofunctional alkyltrialkoxysilane is gamma-isocyanatopolytriethoxysilane or the corresponding hydrolyzate thereof.

References Cited

UNITED STATES PATENTS 3,306,800    2/1967    Plueddemann _____ 161—193

ROBERT F. BURNETT, Primary Examiner

W. J. VAN BALEN, Assistant Examiner

U.S. Cl. X.R.

117—76, 126; 161—193; 264—90. 175